March 9, 1965 L. M. SHOWERS, JR 3,172,210
INVOLUTE PROFILE GAGE
Filed July 30, 1963
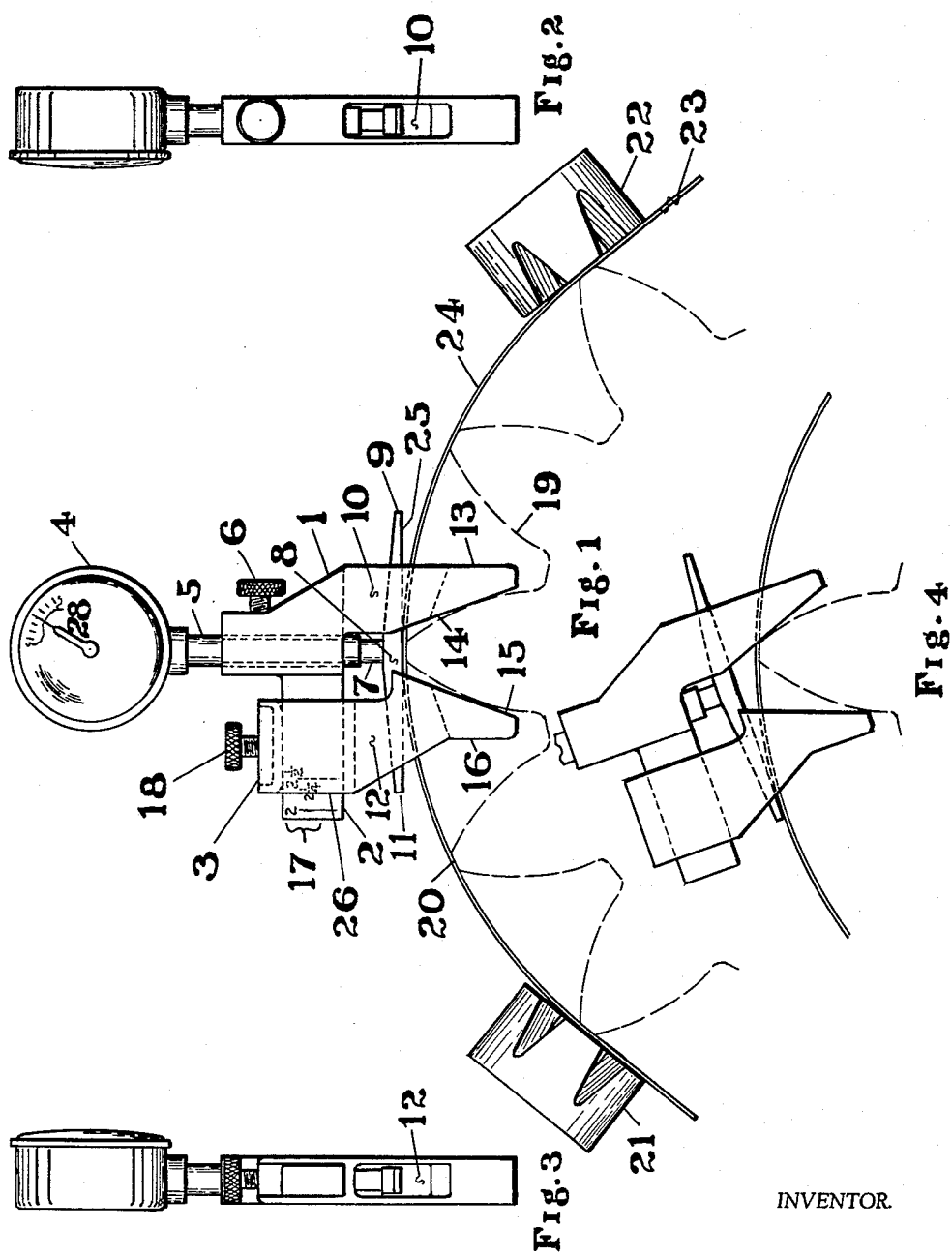
INVENTOR.
Lewis M. Showers Jr.

3,172,210
INVOLUTE PROFILE GAGE
Lewis M. Showers, Jr., Lansdowne, Pa.
(87 School House Lane, R.D. 2, Glen Mills, Pa.)
Filed July 30, 1963, Ser. No. 298,723
2 Claims. (Cl. 33—179.5)

This invention pertains to a tool for determining the accuracy of profile of such objects as gear teeth of the involute form and more particularly of involute traction motor gear teeth.

One object of this invention is to provide a tool, small in size and simple in operation, that will satisfactorily determine the accuracy of profile over a range of involute gear tooth sizes.

It is a further object of this invention to provide a tool that may be use as a wear limit gage for the condemning of involute gear teeth having profile irregularities, induced by wear in service.

Still additional objects, benefits and advantages of this invention will be evident from a study of the following description taken in conjunction with the accompanying drawing, in which:

FIGURE 1 is a front elevation, mounted on a segment of a gear shown by dashed lines.

FIGURE 2 is a side elevation showing the frame side.

FIGURE 3 is a side elevation showing the slide side.

FIGURE 4 is a partial front view, tilted on a tooth profile.

Referring now specifically to the drawing, an involute profile gage made in accordance with the present invention, but confined to 2, 2¼ and 2½ diametrical pitch and 20° pressure angle, which are the most common sizes used in traction motor gearing. Those skilled in the art will readily agree that other pitches and pressure angles could as well be used without departing from the idea of this invention. The drawing is shown to include a frame 1, FIG. 1, having an integral slide arm 2 extending laterally for the guidance and support of a slide head 3.

Slidably supported above frame 1 is a dial gage 4, of the common commercial type, mounted on a stem 5 adjustably secured by thumb screw 6.

Slidably mounted in stem 5 is an actuating rod 7, limited movement of which, is arranged to be registered at graduations 28 on dial gage 4. The lower end of actuator rod 7 is provided with a cross-beam 8 with one end 9 extending a suitable distance through slot 10 in frame 1 and the other end 11 extending a suitable distance through slot 12 in slide head 3.

Extending a suitable distance downward and integral with frame 1 is a projection 13 the inside surface 14 being of a length and on a plane, relative to the axis of dial indicator stem 5, so as to form the boundary of one side of a tooth space of a 20° pressure angle basic rack. Similarly the inside surface 15 of projection 16 on slide head 3 forms the other side and combined they complete a tooth space adjustable for a plurality of diametrical pitches having 20° pressure angles.

Slide arm 2 is perpendicular to dial gage stem 5 and is provided with graduations 17 for the proper setting of slide head 3 to form the corresponding basic rack tooth space between the inside surfaces 14 and 15 when the end surface 26 coincides with indicated graduation at 17. Slide head 3 is provided with a clamping thumb screw 18 to retain adjustment of slide head 3 relative to frame 1.

Involute profile gage, FIG. 1, is shown to be applied to a typical gear 19, indicated by dashed lines, in the process of being gaged.

Threaded through slots 10 and 12 and held in contact with the tops of teeth 20 by means of permanent magnets 21 and 22, is an elastic spring blade 23, forming an arcuate surface 24, having a center substantially coinciding with the axis of gear 19.

Surface 25 of beam 8 is on a plane perpendicular to stem 5 and is adjusted to be in contact with arcuate surface 24 within the effective travel range of dial gage 4 and secured to this adjustment by thumb screw 6.

When using this involute profile gage to determine the accuracy of a tooth profile, first set slide head 3 to the proper diametrical pitch of gear tooth to be measured. This setting is not critical except when the active profile of the tooth is not finished to the full extent of the working depth of the tooth, in which case slide head 3 may require adjustment to a slightly smaller tooth space. Dial gage 4 should be retracted and spring blade 23 inserted in slots 10 and 12. Involute profile gage should then be placed on tooth to be measured and spring blade 23 bent around tops of several teeth and the ends secured by magnets 21 and 22 as shown by FIG. 1. The dial gage 4 should then be adjusted for indication in either direction with beam 8 in contact with arcuate surface 24.

The accuracy of tooth profile is then determined by tilting or oscillating involute profile gage as shown by FIG. 4, in each direction and observing the dial gage 4, FIG. 1, for any change during this operation. Maximum change in dial gage 4 reading may be adapted for limits of allowable contour distortion.

Having thus described this invention, I claim:

1. An involute profile gage for determining the accuracy of the active profiles of a plurality of involute gear tooth sizes, in combination, a dial gage of the common commercial variety for the purpose of micrometer measurement, a dial gage stem for supporting said dial gage on one end, a dial gage actuating rod slidably disposed in said dial gage stem and extending a suitable distance beyond the other end of said stem and arranged to register relative movement on said dial gage, a cross-beam secured to the extended end of said actuating rod and providing a suitable flat rectangular gaging surface perpendicular to said actuating rod, a frame surrounding and adjustably securing said stem and provided with an arm extending a suitable distance and perpendicular to said stem, a suitable slide head adjustably secured on said arm, said arm having graduations to properly locate said slide head for gaging a plurality of gear tooth sizes, suitable rectangular holes in said body and said slide head to accommodate said cross-beam, said body and said slide head each having an extension beyond said cross-beam, said extensions having adjacent tooth contact surfaces angularly reposed, each forming the adjacent side of a basic rack tooth space, an elastic blade extending through and a suitable distance beyond said rectangular holes and having an arcuate surface adjacent to said gaging surface, said gaging surface being tangent to said arcuate surface, a pair of permanent magnets for holding said elastic blade in contact with extremities of a plurality of teeth in the vicinity of the gear tooth to be gaged for involute profile accuracy.

2. An involute profile gage as set fourth in claim 1, in which; inaccuracies of the involute form of a gear tooth is determined by changes in the relation of said body and the tangency of said arcuate surface when said tool is oscillated in proper contact with said involute form.

References Cited by the Examiner
UNITED STATES PATENTS
1,512,626  10/24  Mueller _____ 33—147
1,597,636  8/26  Sykes _____ 33—179.51

FOREIGN PATENTS
347,409  1/22  Germany.

ISAAC LISANN, *Primary Examiner.*